Figure 1:
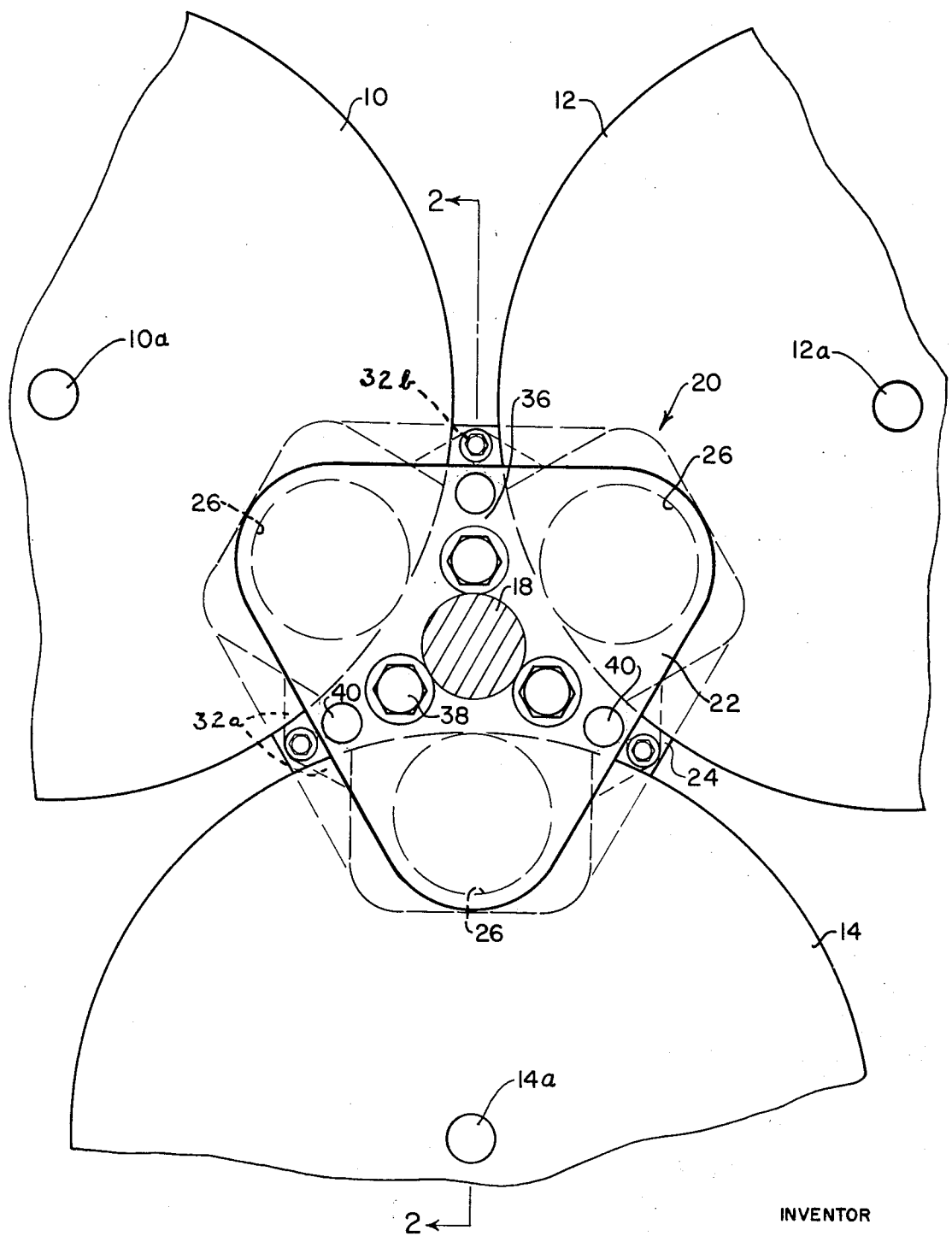

United States Patent

Bricker

[15] 3,687,240
[45] Aug. 29, 1972

[54] CLOVERLEAF BRAKE STRUCTURE

[72] Inventor: Carl E. Bricker, Cuyahoga Falls, Ohio 44224

[73] Assignee: The Goodyear Tire & Rubber Company, Akron, Ohio

[22] Filed: Aug. 25, 1970

[21] Appl. No.: 66,811

[52] U.S. Cl. .................188/71.1, 188/72.4, 188/73.3
[51] Int. Cl. ..........................................F16d 55/224
[58] Field of Search..........188/71.1, 71.5, 72.4, 72.5, 188/73.3, 72.5

[56] References Cited

UNITED STATES PATENTS 854,720    5/1907    Dawson....................188/71.5

FOREIGN PATENTS OR APPLICATIONS 1,072,115   12/1959   Germany..................188/72.4

*Primary Examiner*—George E. A. Halvosa
*Attorney*—F. W. Brunner, P. E. Milliken, Oldham & Oldham, Albert H. Oldham, Vern L. Oldham and Edwin W. Oldham

[57] ABSTRACT

Disclosed is a brake structure for use with a plurality of discs all aligned in a common plane and driven by a common pinion. The brake structure is mounted centrally between the discs and includes a housing on one side of the discs which includes a piston overlying each of the discs. The anvil portion of the brake assembly is located on the opposite side of the discs and is rigidly fastened to the piston housing. The brake assembly is secured to fixed supports by pins extending through the anvil and piston housings. The brake assembly is free to move along the pins in a direction normal to the discs so that uniform pressure is applied on the piston and anvil sides of the discs regardless of the amount of lining wear.

3 Claims, 2 Drawing Figures

INVENTOR
CARL E. BRICKER

BY:
Oldham & Oldham
ATTORNEYS

CLOVERLEAF BRAKE STRUCTURE

Multiple disc brakes of the type which have a number of discs, all lying in a common plane and driven by a pinion on a common shaft, are employed in heavy-duty braking applications, such as heavy earth moving equipment and the like. In such disc arrangements it is advantageous to combine the brake housings for all of the discs into one structure. This arrangement not only reduces the cost and the weight of the brake assembly, but also makes it possible to impose a pure torque load on the brake housing rather than a combination of torque and side load.

It is thus the primary object of the invention to provide a brake structure which combines in a single housing the brakes for a plurality of discs.

It is a further object of the invention to provide a brake housing in which the housing is free to move in a direction normal to the discs so that uniform braking pressure may be applied to the opposite faces of the discs, regardless of the amount of lining wear.

Another object of the invention is the provision of a brake assembly for a plurality of discs which effects a substantial reduction in the manufacturing cost and the combined weight of the brake assembly.

For a more complete understanding of the invention and of the objects and advantages thereof, reference should be had to the following specification and the accompanying drawings wherein there is shown a preferred embodiment of the invention.

Figure 2:
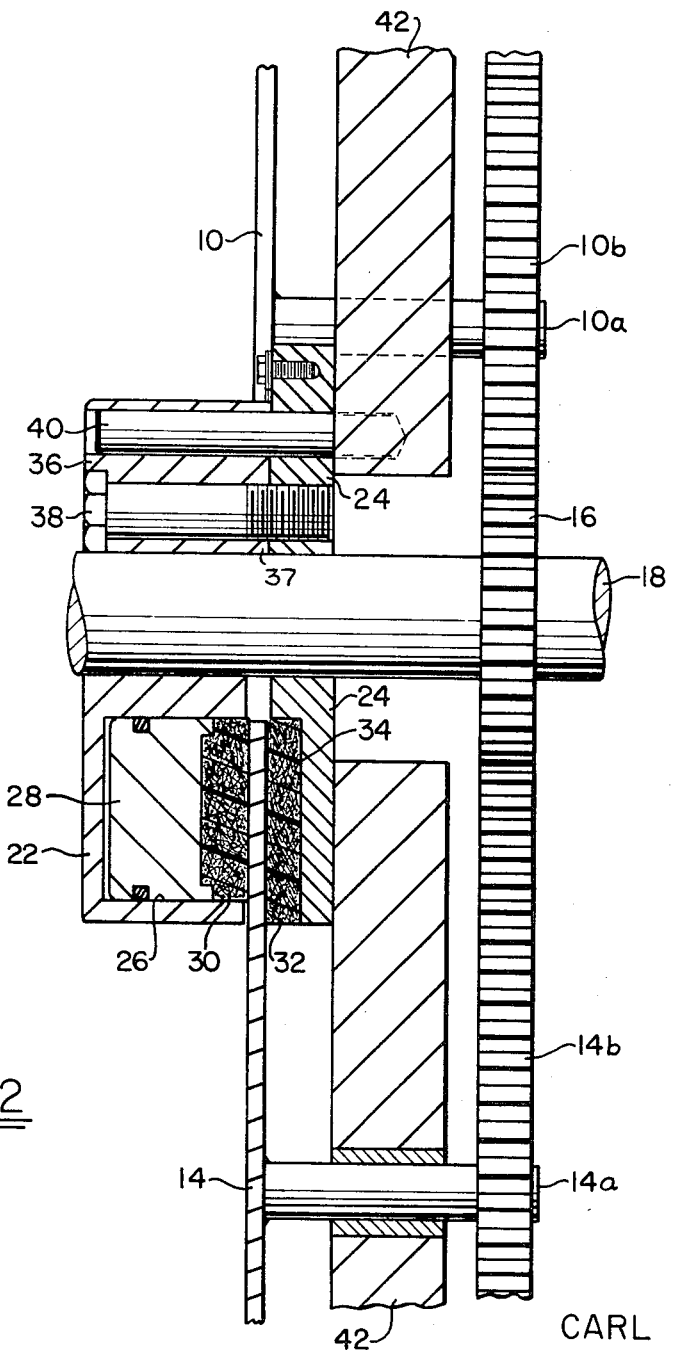

In the drawings:

FIG. 1 is a side elevational view of the brake assembly of the present invention; and FIG. 2 is a fragmentary sectional view taken along the line 2—2 of FIG. 1.

In the embodiment illustrated in the drawing there are provided three discs 10, 12, and 14 lying in a common plane and having their centers at the points of an equilateral triangle. Each of the discs is mounted on a shaft 10a, 12a, 14a, respectively, and each shaft carries a corresponding gear 10b, 12b, and 14b, respectively. The gears 10b, 12b, and 14b are driven by a common pinion 16 on a shaft 18 so that all of the discs rotate uniformly and in the same direction. It should be understood, however, that the features of the brake defined hereinafter would apply to any multiple disc type brake regardless of whether the discs rotated at the same speed or where they were driven from a common source, as long as it is desired to stop them all at the same time.

Mounted centrally of the discs 10, 12 and 14 is the brake assembly, designated generally by the reference numeral 20. This assembly consists of a piston housing 22 located generally on one side of the discs 10–14. The piston housing 22 has a bore 26 in alignment with each of the three discs and a piston 28 is slidably received within each of the bores 26 and carries a pad of friction material 30 on its outer face for engagement with one surface of the adjacent disc. Suitable conduit means (not shown herein) are provided for providing hydraulic fluid to the bore 26 at the rear face of each of the pistons 28. The anvil portion 24 carries pads of friction material 32 in opposed relation to each of the pistons 30 and on the opposite sides of the discs 10–14. The pads 32 are carried in suitable recesses 34 in the anvil portion 24 and are held in position by tabs 32a extending therefrom and locked together at their ends by suitable bolts 32b threadably received into housing 24. The portions 36 of the housing 22 between adjacent discs include a stepped portion 37 which extends to the anvil 24 and bolts 38 secure the housing 22 and anvil 24 as a single unit.

The brake assembly 20 floats with respect to fixed supports 42 by means of pins 40 passing through the piston housing 22 and anvil 24 and secured to the fixed supports 42. It will be noted that the pins 40 extend parallel to the shafts 10a, 12a and 14a and the shaft 18.

When the brakes are applied, each of the discs 10–12 is gripped between the pads 30 and 32. The braking force is transmitted as a torque through the housings 22 and 24 to the fixed pins 40 and the supports 42. As the anvil linings 32 become worn, the force applied to the anvil side of the discs 10–14 decreases. As a result, the brake assembly moves outwardly on the pins 40 until the forces applied to the opposite sides of the discs are again equal.

It will be understood that while the invention has been described with particular reference to a three disc brake assembly, the invention is not so limited. Also, the location of the fixed supports 42 may be on the opposite side of the disc with the housing 22 and anvil housing 24 moving toward the fixed supports on suitable pins as the anvil lining becomes worn. The floating relationship of housings 22 and 24 to account for lining wear, and the ability to use only one housing for brake actuation on three different or separate discs constitute the essential features of the invention.

Since these and other changes may be made in and to the described embodiments of the invention reference should be had to the following claims in determining the true scope of the invention.

What is claimed is:

1. A brake assembly, comprising:
    a plurality of discs lying in a common plane and rotating about parallel axes;
    a fixed support;
    a first housing located centrally of the discs and having portions which overly each of the discs on one side of the common plane, each portion having a bore extending inwardly from the disc;
    a piston slidably received in each bore and movable in a direction normal to the common plane;
    a pad of a friction material carried by each piston for engaging the corresponding disc;
    a second housing located on the opposite side of the discs from the first housing;
    pads of a friction material carried by the second housing in opposed relation to the pads carried by the pistons;
    means connecting the first and second housings rigidly to one another; and
    means connecting the housings to the fixed support in a floating but torque transmitting relationship.

2. The brake assembly according to claim 1 wherein the connecting means comprises pins secured to the fixed support and extending into bores in the anvil and housing.

3. The brake assembly according to claim 1 wherein there are three discs with the centers of the discs lying at the points of an equilateral triangle, the housing being mounted centrally relative to the discs.

* * * * *